United States Patent [19]
Kingsley et al.

[11] Patent Number: 4,944,957
[45] Date of Patent: Jul. 31, 1990

[54] PROCESS AND COMPOSITION FOR IMPROVING THE ORGANOLEPTIC PROPERTIES OF SEAFOOD

[75] Inventors: I. Steven Kingsley, Ridgewood; Victor S. Turback, South Amboy, both of N.J.

[73] Assignee: Cuisine Crafts, Inc., Linden, N.J.

[21] Appl. No.: 309,946

[22] Filed: Feb. 9, 1989

Related U.S. Application Data

[63] Continuation of Ser. No. 15,161, Feb. 17, 1987, abandoned.

[51] Int. Cl.$^5$ ..................... A22C 25/00; A23L 1/325
[52] U.S. Cl. .................................. 426/643; 426/650; 426/652; 426/654
[58] Field of Search ............... 426/643, 650, 652, 654

[56] References Cited

U.S. PATENT DOCUMENTS

| | | | |
|---|---|---|---|
| 2,758,930 | 8/1956 | Toulmin | 426/643 X |
| 3,985,890 | 10/1976 | Brown | 426/643 X |
| 4,476,112 | 10/1984 | Aversano | 426/652 X |
| 4,844,929 | 7/1989 | Kingsley | 426/326 |

FOREIGN PATENT DOCUMENTS

| | | | |
|---|---|---|---|
| 0125021 | 11/1984 | European Pat. Off. | 426/649 |
| 0198071 | 12/1982 | Japan | 426/652 |

*Primary Examiner*—Joseph Golian
*Attorney, Agent, or Firm*—Walter Scott

[57] ABSTRACT

The present application discloses a composition which, when added to seafood prior to when said seafood is cooked, improves the organoleptic properties of seafood treated with said composition. The seafood may be cooked by any conventional means of cooking seafood. Also disclosed is a process for treating seafood to improve its organoleptic properties.

19 Claims, No Drawings

PROCESS AND COMPOSITION FOR IMPROVING THE ORGANOLEPTIC PROPERTIES OF SEAFOOD

This application is a continuation of application Ser. No. 015,161, filed Feb. 17, 1987, now abandoned.

BACKGROUND OF THE INVENTION

The present invention relates to a composition which when used in the process of the present invention improves the organoleptic properties of fresh and saltwater seafood.

Seafood has long been recognized as a nutritious food source. However, seafood has organoleptic properties, which on at least some occasions, many people find repulsive. One method used in the past to modify the organoleptic properties of seafood has comprised the addition of the solution obtained from a jar of pickles to said seafood prior to cooking. Nonetheless, there remains a need for a convenient means of making seafood more palatable to many people.

It is an object of the present invention to provide a means to make any piece of seafood more palatable.

It is also an object of the present invention to provide a composition which will improve the organoleptic properties of seafood.

It is a further object of the present invention to improve the fluid retention of seafood.

It is yet another object of the present invention to reduce or remove the "fishy" flavors of seafood.

It is still a further object of the present invention to provide a process for preparing seafood which is substantially odorless.

BRIEF DESCRIPTION OF THE INVENTION

The present invention comprises a composition which, when combined with seafood according to the process of the present invention, improves the organoleptic properties of said seafood. Additionally, the process and the composition of the present invention improve the fluid retention of the seafood during its preparation.

DETAILED DESCRIPTION OF THE INVENTION

The process and the composition of the present invention improve the organoleptic properties of a wide variety of seafood. The present invention is applicable to both fresh and salt water seafood and is also applicable to both fish and shellfish. Moreover, the present invention is also applicable to both freshly caught and to stored seafood. With regard to stored seafood, the present invention is applicable to both refrigerated, frozen, and frozen and thawed seafood.

The composition of the present invention may be added to seafood at any time after the seafood has been caught and before it is prepared for consumption. However, it is preferred that the composition is added after the seafood is cleaned.

The composition of the present invention comprises:
a. between about 30 and about 97 percent, by weight (hereinafter all percentages are by weight unless noted otherwise), salt; b. between about 2.2 and about 30 percent of an organic acid approved for use in food materials; c. between about 0.5 and about 20 percent of a calcium salt; d. between about 0.1 and about 15 percent of a sweetening agent; and e. between about 0.2 and about 37 percent of a flavoring/masking agent. Optionally the composition of the present invention may comprise other components including a coloring agent.

In the present invention, salt is believed to function as both a flavoring agent and as an infusion aid. As an infusion aid, the salt of the composition of the present invention is believed to effect to osmotic pressure gradient between the exterior and the interior of the seafood. The salt is thus believed to increase the rate at which the salt and the other ingredients of the composition of the present invention are adsorbed into the seafood.

While sodium chloride is a preferred salt, it is believed that any salt substitute which is approved for use in food preparation will function in the process and composition of the present invention.

It is further preferred that the salt used in the composition of the present invention has a commercial fine crystal salt particle size distribution (approximately 200 to 500 microns). It is also further preferred that the salt comprises between about 40 and about 75 percent salt and it is even further preferred that the composition of the present invention comprise between about 45 and about 65 percent salt.

It is believed that the organic acid approved for use in food materials acts, in the composition of the present invention, as a flavoring agent, as an infusion aid (in a manner similar to the manner in which salt is believed to act in the process of the present invention), as an acidulant and as a deodorizing agent. It is also believed the odorous compounds are developed when seafood is stored and/or cooked and that at least some of the odorous compounds so formed are sulfide bond containing compounds. It is further believed that the organic acid acts as a deodorizing agent by breaking down sulfide bonds of odorous compounds present in the seafood, including such odorous compounds as hydrogen sulfide and mercaptans.

The organic acid may be any organic acid or salt of an organic acid approved for use in food materials, or combination of such organic acids and their salts. It is preferred that the organic acid is selected from the group composed of malic acid, tartaric acid, lactic acid, acetic acid, citric acid, fumaric acid, gluconic acid; food approved salts of malic acid, tartaric acid, lactic acid, acetic acid, citric acid, fumaric acid, gluconic acid; and combinations thereof. It is further preferred that the organic acid which is used in the composition of the present invention is chosen from the group composed of malic acid, tartaric acid, lactic acid, citric acid, the salts of these acids and combinations thereof. It is still further preferred that the organic acid which is used in the composition of the present invention is chosen from the group composed of malic acid, tartaric acid, lactic acid, citric acid and combinations thereof.

While the organic acid may be present in the composition of the present invention at levels between about 2.2 and about 30 percent, it is preferred that between about 10 and about 28 percent of the composition of the present invention is an organic acid. It is more preferred that the composition of the present invention is between about 15 and about 25 percent of an organic acid.

In the process of the present invention, the calcium salt is believed to act both as a liquid retention agent and as a firming agent. The calcium salt appears to coat the surface of the seafood and thereby reduces the loss of liquids from the seafood during cooking and other preparation steps. Additionally, the calcium salt is believed to, at the temperatures present during the cooking of seafood, form at least some cross-links between the proteinaceous materials present in the seafood.

While it is preferred that the calcium salt is selected from the group consisting of calcium sulfate, calcium chloride, calcium nitrate, calcium oxide, calcium acetate, calcium lactate, calcium gluconate and combinations thereof, it is necessary that the calcium salt used in the composition and process of the present invention is approved for use in food materials. It is further preferred that the calcium salt is calcium sulfate.

While the calcium salt may be present in the composition of the present invention at levels between about 0.5 and about 20 percent, it is preferred that between about 5 and about 15 percent of the composition of the present invention is calcium salt. It is more preferred that between about 8 and about 12 percent of the composition of the present invention is calcium salt.

It is believed that the sweetening agent in the process of the present invention act as a flavoring agent and as a infusion agent in a manner analogous to the manner in which the salt functions as an infusion agent.

The sweetening agent of the present invention may be any sweetening agent which is approved for use in cooking processes. Preferred sweetening agents include sucrose, dextrose, aspartame and combinations thereof. It is more preferred that the sweetening agent is selected from the group composed from sucrose, aspartame and combinations thereof. Sucrose is the most preferred sweetening agent in the composition of the present invention. It is also preferred that the sweetening agent is a fine crystalline material or of a finer particle size, such as the powder which results from grinding a fine crystalline sweetening agent.

While the sweetening agent may be present in the composition of the present invention at levels between about 0.1 and about 15 percent, it is preferred that between about 3 and about 10 percent of the composition of the present invention is a sweetening agent. It is more preferred that between about 4 and about 8 percent of the composition of the present invention is a sweetening agent.

The flavoring/masking agent of the present invention both adds flavor to the seafood treated by the process of the present invention and it masks flavors present in the seafood of the present invention which reduce the palatability of the seafood to at least some consumers.

While the flavoring/masking agent may be present in the composition of the present invention at levels between about 0.2 and about 37 percent, it is preferred that between about 2.5 and about 20 percent of the composition of the present invention is a flavoring/masking agent. It is more preferred that between about 3.5 and about 17.5 percent of the composition of the present invention is a flavoring/masking agent.

The flavoring/masking agent of the present invention may comprise three components; a flavoring material, spice and onion. The flavoring material may be any traditional flavoring material such as dairy flavors (i.e. butter, cream and sour cream flavors), pepper flavors (i.e. jalapeno flavor), spice flavors (i.e. dill flavors), fruit flavors (i.e. grape, lemon, orange or apple flavor), smoke flavors, wine flavors and combinations thereof. It is preferred that the flavoring material is selected from the group composed of dairy flavors, spice flavors, fruit flavors, wine flavors and combinations thereof. Moreover, the flavoring material may be either natural or artificial.

The flavoring material is typically present in the composition of the present invention at a level between about 0.1 and about 25 percent. When an artificial flavoring material is used in the composition, it is preferred that the flavoring material is present at a level between about 0.15 and about 10 percent and it is more preferred that the flavoring material is present at a level between about 0.25 and about 7.5 percent. When the flavoring material is natural, it is preferred that the flavoring material is present at a level between about 0.5 and about 25 percent and it is more preferred that the flavoring material is present at a level between about 1 and about 13.5 percent. When a combination of natural and artificial flavoring material is used, it is preferred that the flavoring material is present at a level between about 0.25 and about 13.5 percent.

The spice may be any traditional spice or spice extract such as coriander, curry powder, ground pepper, rosemary, sage, thyme, bay leaves, parsley and combinations thereof. It is preferred that the spice is selected from the group composed of coriander, ground pepper, bay leaves and combinations thereof. It is also preferred that the spice is present in the composition of the present invention as a solid and it is more preferred that the spice material is present as a finely ground solid. It is further preferred that the ground dry spice material has a particle size distribution of about 100 to about 500 microns.

The spice is typically present in the composition of the present invention at a level between about 0.1 and about 7.5 percent. However, it is preferred that the spice is present in the composition of the present invention at a level of between about 1.5 and about 4.5 percent.

The onion present in the composition of the present invention may be present in any form approved for use in food preparation processes. However, it is preferred that the onion is present in the composition as an extract of onion oils, and it is more preferred that the onion is present as an extract of onion oils plated on a carrier approved for use in food materials) such as salt. Moreover, garlic in any food approved form will work in the process of the present invention as a substitute for the onion.

The onion is typically present in the composition of the present invention at a level between about 0 and about 7.5 percent. However, it is preferred that the onion is present in the composition of the present invention at a level of between about 0.5 and about 2.5 percent.

Optionally, the composition of the present invention may comprise a coloring agent. The coloring agent may be any material effective to modify the color of seafood which is approved for use with food materials under the conditions present when seafood is prepared for consumption. Preferably, the coloring agent comprise natural coloring agents, such as carotene and beet coloring agents. It is also preferred that the composition of the present invention comprise between about 0.1 and about 5.0 percent coloring agent.

The composition of the present invention may be added to seafood as either an aqueous suspension/dispersion/solution or as a powder. Typically, when the composition of the present invention is added to seafood as an aqueous suspension/dispersion/solution, the composition of the present invention is between about 0.5 and about 10 percent of the aqueous suspension/dispersion/solution. Preferably, the composition is between about 1.5 and about 5 percent of the aqueous suspension/dispersion/solution. When the composition of the present invention is added to the seafood as a powder, between about 5 and about 20 grams of the composition are sprinkled on a pound of seafood. Preferably, between about 10 and 15 grams of the composition are sprinkled on the seafood, and more preferably, between about 12 and 14 grams of the composition are sprinkled on the seafood.

After the composition of the present invention has been added to the seafood, the seafood may be further processed. For example, the seafood, with the composition of the present invention, may be fried, breaded, frozen, refrigerated or a combination thereof.

The seafood in combination with the composition of the present invention is prepared for consumption in any conventional manner. Thus the seafood may be prepared for consumption by simmering, poaching, steaming, broiling, boiling, baking, grilling, or any combination thereof.

EXAMPLE 1

A lemon flavored composition for improving the organoleptic properties of seafood is prepared by combining the following ingredients in the amounts specified:

| Ingredient | % of Total |
| --- | --- |
| Salt | 59.00 |
| Malic Acid | 19.00 |
| Calcium Sulfate | 9.70 |
| Sugar | 5.00 |
| Tartaric Acid | 3.00 |
| Lemon Flavoring | 1.50 |
| Ground Coriander | 1.25 |
| Smoke Flavoring | 0.85 |
| Ground Bay Leaves | 0.70 |
| TOTAL | 100.00 |

Once combined, the ingredients are then blended to form a homogeneous mixture.

21.5 grams of this composition is added to 2 cups of hot water in a sauce pan and the combination is mixed to form a suspension/dispersion/solution. Next, ½ pound of fresh fish is added to the pan and the pan is covered. The pan and its contents are slowly heated to about boiling, and then the heat is turned down to simmer. Depending upon the size and thickness of the piece(s) of fish being cooked, the fish is simmered between 5 and 10 minutes.

Alternatively, the 21.5 grams of the blended ingredients are added to the 2 cups of hot water in a microwavable container. The fish, again ½ pound, is added to the microwavable container and the fish and suspension/dispersion/solution are simmered for between 2 and 5 minutes in a microwave oven.

EXAMPLE 2

A burgundy composition for improving the organoleptic properties of seafood is prepared by combining the following ingredients in the amounts specified:

| Ingredient | % of Total |
| --- | --- |
| Salt | 57.20 |
| Malic Acid | 19.00 |
| Calcium Sulfate | 9.70 |
| Sugar | 5.00 |
| Tartaric Acid | 3.00 |

-continued

| Ingredient | % of Total |
| --- | --- |
| Beet Coloring | 2.00 |
| Grape Flavoring | 1.30 |
| Ground Coriander | 1.25 |
| Smoke Flavoring | 0.85 |
| Ground Bay Leaves | 0.70 |
| TOTAL | 100 |

Once combined, the ingredients are then blended to form a homogeneous mixture.

About 5 to 10 grams of this mixture are then sprinkled on each side of about ½ pound of thawed-out shellfish, which had previously been frozen. The shellfish is then placed on a steaming tray, which in turn is placed in a preheated steaming pot and the pot is closed. Depending on the size, thickness and to what extent the shellfish remain frozen, the shellfish are steamed for about 1 to 3 minutes.

If desired to intensify to burgundy flavor, an additional light coating of the above mixture can be sprinkled on the steamed shellfish.

EXAMPLE 3

A buttery herb flavored composition for improving the organoleptic properties of seafood is prepared by combining the following ingredients in the amounts specified:

| Ingredient | % of Total |
| --- | --- |
| Salt | 51.00 |
| Malic Acid | 15.50 |
| Calcium Sulfate | 9.70 |
| Sugar | 7.00 |
| Butter Powder | 7.50 |
| Butter Flavoring | 4.25 |
| Onion Oil (on Salt) | 1.25 |
| Ground Coriander | 1.25 |
| Ground Pepper | 1.00 |
| Smoke Flavoring | 0.85 |
| Ground Bay Leaves | 0.70 |
| TOTAL | 100 |

Once combined, the ingredients are then blended to form a homogeneous mixture.

Sprinkle about 5 to about 10 grams of the above mixture on both sides of ½ pound of fish fillets. The fish fillets are then placed in an oven preheated to 450° F. and broiled until ready for consumption, which would be between 4 and 10 minutes.

After the fillets have been broiled, an additional light coating of the above mixture can be sprinkled on the broiled fillets, if desired, to intensify the flavor.

EXAMPLE 4

A tangy french flavored composition for improving the organoleptic properties of seafood is prepared by combining the following ingredients in the amounts specified:

| Ingredient | % of Total |
| --- | --- |
| Salt | 53.95 |
| Malic Acid | 15.50 |
| Calcium Sulfate | 9.70 |
| Sugar | 7.00 |
| Sour Cream Powder | 7.50 |
| Cream Flavoring | 1.30 |
| Onion Oil (on Salt) | 1.25 |

-continued

| Ingredient | % of Total |
| --- | --- |
| Ground Coriander | 1.25 |
| Ground Pepper | 1.00 |
| Smoke Flavoring | 0.85 |
| Ground Bay Leaves | 0.70 |
| TOTAL | 100 |

Once combined, the ingredients are then blended to form a homogeneous mixture.

Refrigerated fish fillets are sprinkled with the above mixture and then placed, and baked, in a preheated oven at 325° F. for 6 to 15 minutes depending on the size and thickness of the fillets. Alternatively, the fillets are baked for 2 to 6 minutes in a regular or convection microwave oven. When done, an additional coation of the above mixture can be sprinkled on the fillets, if desired, to intensify the flavor.

EXAMPLE 5

A hot and spicy flavored composition for improving the organoleptic properties of seafood is prepared by combining the following ingredients in the amounts specified:

| Ingredient | % of Total |
| --- | --- |
| Salt | 51.00 |
| Malic Acid | 19.00 |
| Calcium Sulfate | 9.70 |
| Sugar | 5.00 |
| Tartaric Acid | 3.00 |
| Jalapeno Flavor | 6.00 |
| Onion Oil (on Salt) | 1.60 |
| Ground Coriander | 1.25 |
| Ground Pepper | 1.00 |
| Smoke Flavoring | 1.75 |
| Ground Bay Leaves | 0.70 |
| TOTAL | 100 |

Once combined, the ingredients are then blended to form a homogeneous mixture.

About ½ pound of fresh shellfish is sprinkled with about 5 to 15 grams of the above mixture and then placed on a lightly oiled grill which has been preheated to between 300 and 350° F. The shellfish pieces are turned several time during their 3 to 6 minute cooking time. Once cooked, an additional coating of the above mixture can be sprinkled on the grilled shellfish, if desired to intensify the flavor.

What we claim is:

1. A composition useful to improve the organoleptic properties of seafood comprising:
    a. about 30 to 97 percent, by weight, salt;
    b. about 2.2 to 30 percent, by weight, of an organic acid approved for use in food materials;
    c. about 0.5 to 20 percent, by weight, calcium salt;
    d. about 0.1 to 15 percent, by weight, of a sweetening agent; and
    e. about 0.2 to 37 percent, by weight, of a flavoring-/masking agent.

2. A composition according to claim 1 wherein the calcium salt is selected from the group consisting of calcium sulfate, calcium chloride, calcium nitrate, calcium oxide, calcium acetate, calcium lactate, calcium gluconate and combinations thereof.

3. A composition according to claim 1 wherein the calcium salt is calcium sulfate.

4. A composition according to claim 1 wherein the sweetening agent is sucrose.

5. A composition according to claim 1 wherein the organic acid is selected from the group consisting of malic acid, tartaric acid, lactic acid, citric acid, the salts of these acids and combinations thereof.

6. A composition according to claim 1 wherein the organic acid is selected from the group consisting of malic acid, tartaric acid, lactic acid, citric acid and combinations thereof.

7. A composition according to claim 1 wherein the salt is sodium chloride.

8. A composition according to claim 1 wherein:
    the calcium salt is calcium sulfate;
    the sweetening agent is sucrose;
    the organic acid is selected from the group consisting of malic acid, tartaric acid, lactic acid, citric acid and combinations thereof; and
    the salt is sodium chloride.

9. A seafood composition having improved organoleptic properties comprising:
    a. about 30 to 97 percent by weight, salt;
    b. about 2.2 to 30 percent, by weight, of an organic acid approved for use in food materials;
    c. about 0.5 to 20 percent, by weight, calcium salt;
    d. about 0.1 to 15 percent, by weight, of a sweetening agent;
    e. about 0.2 to 37 percent, by weight, of a flavoring-/masking agent; and
    f. a piece of seafood.

10. A composition according to claim 9 wherein:
    the calcium salt is calcium sulfate;
    the sweetening agent is sucrose;
    the organic acid is selected from the group consisting of malic acid, tartaric acid, lactic acid, citric acid and combinations thereof; and
    the salt is sodium chloride.

11. A process for preparing seafood having improved organoleptic properties comprising:
    a. adding a composition comprising:
        1. about 30 to 97 percent, by weight sodium chloride;
        2. about 2.2 to 30 percent, by weight, of an organic acid approved for use in food materials;
        3. about 0.5 to 20 percent, by weight, of a calcium sulfate;
        4. about 0.1 to 15 percent, by weight, of a sweetening agent; and
        5. about 0.2 to 37 percent, by weight, of a flavoring/masking agent;
        to seafood, and
    b. cooking said seafood.

12. The product of the process according to claim 11.

13. A process for preparing seafood having improved organoleptic properties according to claim 11 wherein the seafood is frozen after the addition of the added composition.

14. The product of the process according to claim 13.

15. A process for preparing seafood having improved organoleptic properties according to claim 11 wherein the seafood is cleaned prior to the addition of the added composition.

16. A process for preparing seafood having improved organoleptic properties for commercial distribution comprising:
    a. adding a composition comprising:
        1. between about 30 and about 97 percent, by weight, salt;

2. between about 2.2 and about 30 percent, by weight, of an organic acid approved for use in food materials;
3. between about 0.5 and about 20 percent., by weight, calcium salt;
4. between about 0.1 and about 15 percent, by weight, of a sweetening agent; and
5. between about 0.2 and about 37 percent, by weight, of a flavoring/masking agent; to seafood, and b. freezing said seafood.

17. A process according to claim 16 which further comprises the step of cleaning said seafood prior to the addition of the added composition.

18. The product of the process according to claim 17.

19. A process according to claim 11 for preparing seafood having improved organoleptic properties wherein said seafood further comprises a fishy taste, odor or combination thereof.

* * * * *